Aug. 18, 1942. W. L. DAVIS Re. 22,160

PUMP

Original Filed June 23, 1939 3 Sheets-Sheet 1

INVENTOR.
W. L. DAVIS
BY Oberlin, Limbach & Day
ATTORNEYS

PUMP

Original Filed June 23, 1939 3 Sheets-Sheet 2

INVENTOR.
W. L. DAVIS
BY Oberlin, Limbach & Day
ATTORNEYS

PUMP

Original Filed June 23, 1939 3 Sheets-Sheet 3

INVENTOR.
W. L. DAVIS
BY Oberlin, Limbach & Day
ATTORNEYS

Reissued Aug. 18, 1942

Re. 22,160

UNITED STATES PATENT OFFICE 22,160

PUMP

Walwin L. Davis, Avon, Ohio

Original No. 2,260,888, dated October 28, 1941, Serial No. 280,828, June 23, 1939. Application for reissue November 28, 1941, Serial No. 420,867

7 Claims. (Cl. 103—138)

Figure 1:
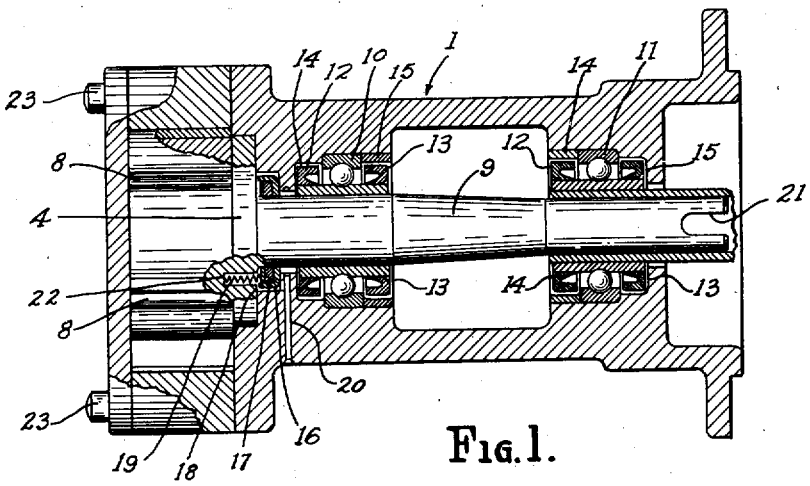

This invention relates to a rotary pump having a plurality of rigid sliding vanes of constant length and has for its principal object the provision of a pump which will produce an even flow of liquid through the pump without producing pronounced or appreciable pulsations in the flow.

One of the objections to rotary pumps of this type has been that the flow of liquid through the pump has caused pulsations of varying magnitude depending upon the shape and design of the pump bore and, in some cases, upon the ratio of bore diameter to rotor diameter.

The invention contemplates the use of a pump bore of such shape and design as to practically eliminate this objectionable feature. My improved pump comprises a pump body having a cavity formed therein which is provided with an inlet port and an outlet port, together with a rotor eccentrically mounted in the cavity and having a plurality of rigid vanes of constant length slidably mounted in the rotor and having contact at all times, at the opposite ends thereof, with the walls of the cavity and dividing the cavity into a plurality of working chambers, the cavity preferably having a cross section which is made up of two oppositely disposed concentric circular arcs each less than a semicircle and two adjoining curved sections disposed nearly but not exactly tangent to the circular arcs and so shaped as to produce a sliding movement of the vanes within the rotor and longitudinally of themselves of uniform velocity when the rotor is rotated at uniform angular velocity. The circular arcs are true segments of a circle the radii of which are struck from the same center point, which center point is the center of rotation of the rotor. The portions of the pump bore which connect with the circular arcs are so constructed as to provide an even running clearance for a solid vane having a length equal to the sum of the radii of the two circular arcs. The pump vanes are slidably mounted in the rotor and rotate about the center point of rotation of the rotor. The displacement of the pump depends upon the volume of liquid displaced by the vanes traveling through the circular section of the bore as any point in this section of the bore is equidistant from the center of rotation so that there can be no substantial variation in the volume of liquid displaced. The non-circular or generated portions of the pump bore may produce a substantial variation in the displacement, if not properly constructed or generated. There will be a variation in displacement in the generated portions of the bore if the vanes do not recede or slide back into the rotor a uniform distance for each degree of rotation of the rotor. In other words, the vanes sliding back into the rotor having the effect of decreasing the displacement of the pump and if this rate of recession of the vanes is not at uniform velocity there will be pronounced pulsation in the flow.

In the preferred embodiment of the invention the formula used for locating any point within the generated portions of the bore which will produce a uniform rate of recession of the vanes is the same as the mathematical formula for an Archimedes spiral. It will therefore be seen that the non-circular portions of the pump bore are portions of an Archimedean spiral of common foci. In order to provide a smooth flow non-pulsating pump of this character, it is preferable to provide a pump bore the shape of which is a combination of two arcs of circles having different radii struck from the same center point of rotation and diametrically opposed to each other and joined on either side by complementary shaped portions in the form of Archimedean spirals the equation for which is $(r=a\theta)$, the shape of such spirals being governed by the difference between the radii forming the circular portions of the bore and the extent of the portions of the spirals employed being determined by the angles formed by the blades.

Two or more vanes may be used depending upon the specific design of the pump and the work which it is intended to do. It is possible and usually most desirable to design a pump bore such that the two portions of circular arcs are interposed between the angle formed by one pair of vanes only, thus in a three-vane pump the angle of the circular arc would be 60° or in a four-vane pump the angle of the circular arc would be 45° neglecting the thickness of the vanes. It is also possible to design a pump bore so that the angles of the circular arcs are interposed between twice the angle formed by one pair of vanes in which case the length of the circular arc for a three-vane pump would be 120° and for a four-vane pump 90°. The advantage of a four-vane pump is that there will be two vanes disposed in the working portion of the bore which would have the effect of reducing the slip which would ordinarily get by one vane working in the same portion of the bore. The three-bladed pump would have the objection over the four-bladed pump that the generated portions of the bores will impart a rapid sliding movement to the vanes.

The pump vanes may be made with or without packing strips or rockers on the ends thereof, whichever design would tend toward more efficient operation for the particular service required for the pump. In any case, the curvature of the non-circular portions of the bore should be such that, for each degree of movement of the rotor, the pump vanes will slide through the rotor a uniform distance so that the volume increase or decrease of any pump chamber is constant.

Figure 2:
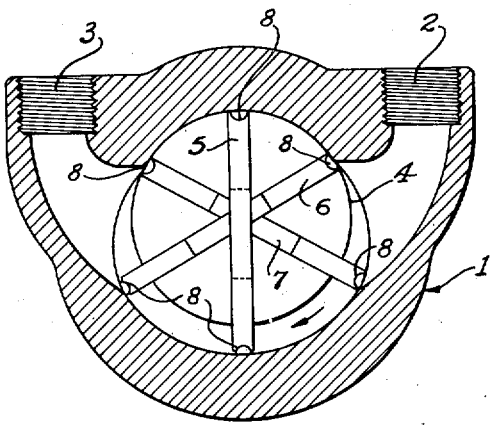
Figure 3:
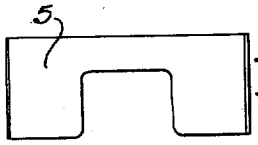
Figure 4:
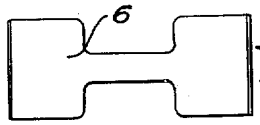
Figure 5:
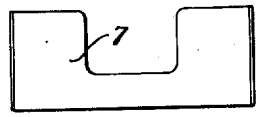
Figure 6:
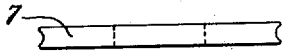
Figure 7:
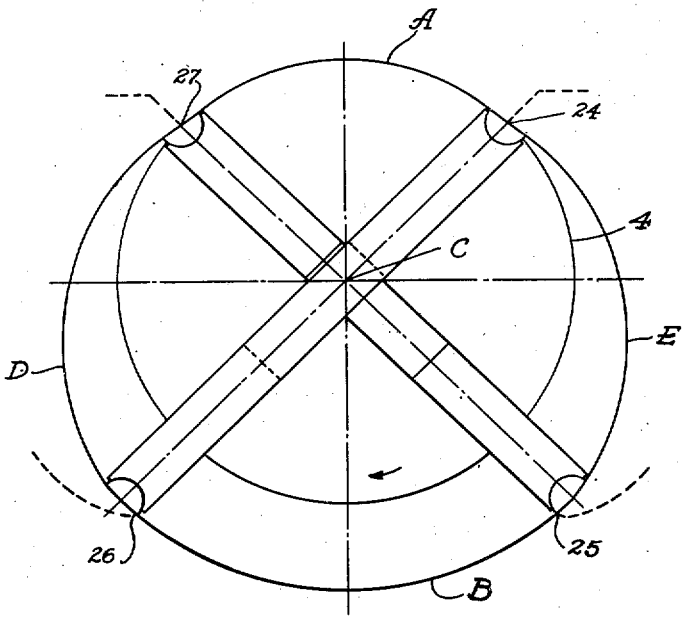
Figure 8:
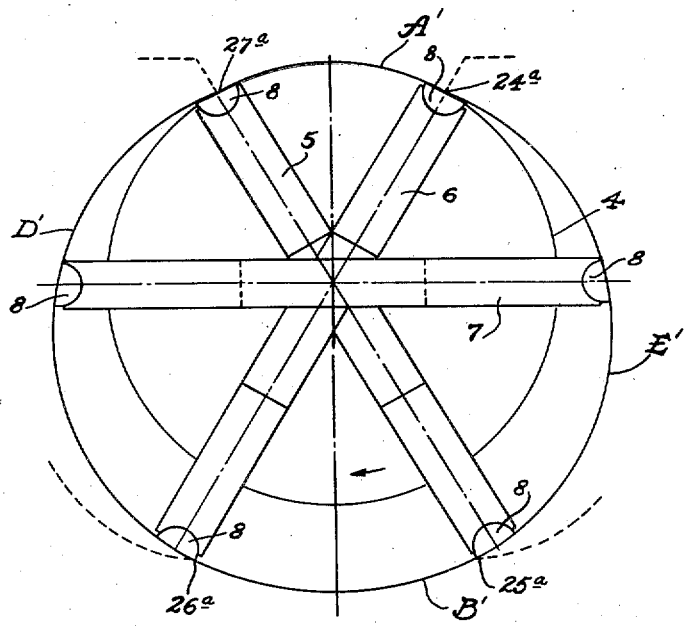
Figure 9:
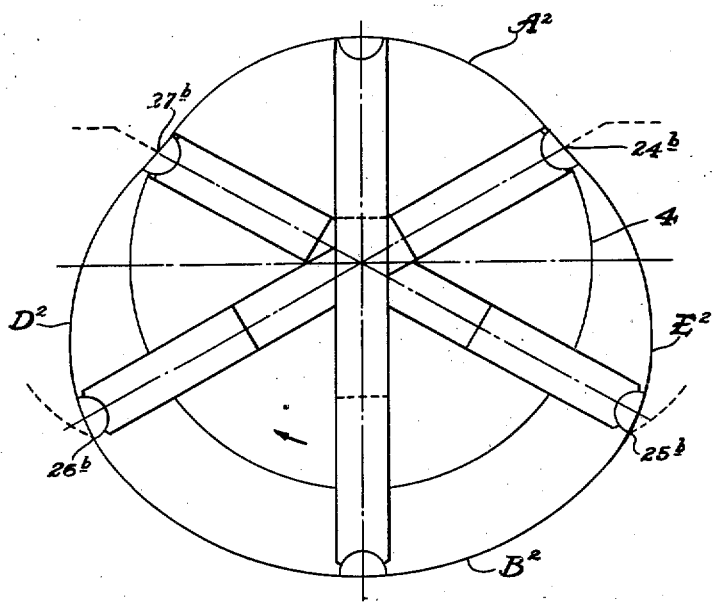
Figure 10:
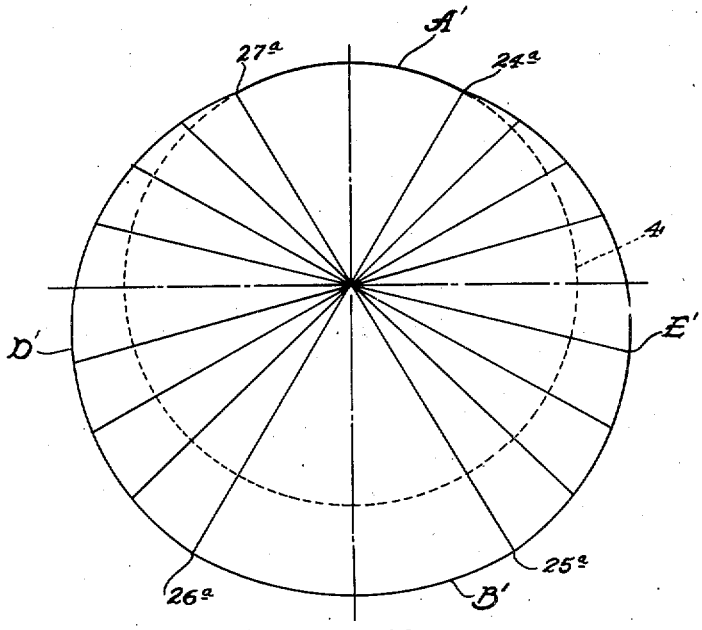

Further and more limited objects of the invention will appear as the description proceeds and by reference to the accompanying drawings in which Fig. 1 is a longitudinal vertical sectional view of the pump; Fig. 2 is a vertical sectional view of the pump body taken at right angles to the view shown in Fig. 1; Figs. 3, 4 and 5 are views in side elevation of the pump blades; Fig. 6 is a view in elevation of one of the pump blades; Fig. 7 is a somewhat diagrammatic view showing a two-bladed pump, with the inlet and outlet ports indicated in dotted lines; Fig. 8 is a view similar to Fig. 7 showing a three-bladed pump; Fig. 9 is a view similar to Fig. 8 showing a three-bladed pump; and Fig. 10 is a diagrammatic view illustrating the pump bore with the rotor shown in dotted lines.

Referring now to the drawings, the reference character 1 designates generally the pump body having a cavity formed therein defining a working chamber and provided with an inlet 2 and an outlet 3. Rotatably mounted in the pump and eccentrically disposed within the cavity is a rotor 4 in which are slidably mounted a plurality of rigid vanes 5, 6 and 7, the opposite ends of which are recessed and received therein rockers 8. The vanes and rockers together provide pump blades which are of constant length and have contact at the opposite ends thereof with the walls of the pump cavity. The rotor has an outwardly extending shaft portion 9 which is journaled in the pump body in bearings 10 and 11. Disposed at each side of the bearings are leather packing members 12 and 13 which are held in place by metal cages 14 and 15. Surrounding the rotor shaft adjacent the inner end thereof is a steel disk 16 the peripheral edge of which is bent outwardly and receives therein a rubber washer or disk 17. Disposed over the rubber washer 17 is a steel ring 18 which is urged against the rubber washer by a plurality of springs disposed within recesses provided in the body of the rotor, one of which is shown at 19. A suitable bore or passageway 20 is provided in the body of the pump through which any excess lubricant may escape. The outer end of the rotor shaft is recessed as shown at 21 and is adapted to be connected with any suitable source of power. The outer end of the pump cavity is closed by a removable plate 22 which is secured in place by bolts 23. The pump cavity has a cross section which is made up of a pair of circular arcs A and B, each less than a semicircle and struck from a common center C, and two adjoining oppositely disposed complementary shaped arcs D and E the opposite ends of which are disposed substantially but not exactly tangent to the circular arcs. The circular arcs are true segments of a circle which is struck from a common center C which center point is the center of rotation of the rotor. The non-circular or generated portions of the pump bore which connect with the circular arcs are so constructed as to provide an even running clearance for the vanes which have a length equal to the sum of the radii of the two circular arcs. These non-circular or generated portions of the pump bore are complementary portions of an Archimedean spiral of common foci. The curvature of the non-circular portions of the pump bore should be such that, for each degree of movement of the pump there will be a constant displacement of liquid and the vanes will be caused to slide through the rotor at a uniform velocity upon rotation of the rotor.

The size of the inlet and outlet ports is determined by the number of blades. In Fig. 7 there is disclosed somewhat diagrammatically a two-bladed pump in which the inlet port extends from the point 24 to the point 25, while the outlet port extends from the point 26 to the point 27. Each working chamber of the pump as it approaches the discharge position will contain the same volume of liquid and the vanes will recede into the rotor a uniform distance for each degree of rotation of the rotor. The volume increase or decrease of any pump chamber, due to the sliding of the vanes in the rotor, is constant and uniform.

In Fig. 8 there is diagrammatically disclosed a three-bladed pump. The circular portions of the pump bore are indicated by the reference characters A′ and B′ and the length of the inlet port is the distance from the point 24[a] to the point 25[a], while the length of the discharge port is the distance between the points 26[a] and 27[a]. The non-circular portions of the pump bore are indicated by the reference characters D′ and E′ and extend over an arc of 60°.

In Fig. 9 there is diagrammatically disclosed a three-bladed pump in which the circular portions of the pump bore are indicated by the reference characters $A^2$ and $B^2$, while the generated or non-circular portions of the bore are indicated by the reference characters $D^2$ and $E^2$. The length of the inlet port is the distance between the points 24[b] and 25[b] and the length of the outlet port is the distance between the points 26[b] and 27[b]. In the form of pump disclosed in Fig. 9 the circular portions $A^2$ and $B^2$ extend over an arc of 120°.

In Fig. 10 there is disclosed a diagrammatic illustration of the pump bore for a three-vane pump. The circular portions of the pump bore are indicated by the reference characters A′ and B′ and the non-circular or generated portions of the bore are indicated by the reference characters D′ and E′. The circular arc A′ extends over an arc of 60° and the circular arc B′ likewise extends over an arc of 60°. The non-circular portions D′ and E′ connect with the circular arcs A′ and B′ at the opposite ends thereof. The non-circular portions D′ and E′ are complementary portions of an Archimedean spiral.

It will be seen that in the three-bladed pump shown in Fig. 9 there are two adjacent working chambers discharging one after the other so that any slippage past one blade of the pump will escape into the next succeeding chamber. In the two-bladed pump the length of each of the circular arcs A and B is 90°, whereas in the three-bladed pump shown in Figs. 8 and 9, the lengths of the circular arcs are 60° and 120° respectively.

It will also be seen that irrespective of the number of blades or vanes used, the pump bore is made up of a pair of oppositely disposed concentric circular sections each less than a semicircle and two adjoining oppositely disposed complementary curved sections the opposite ends of which are disposed substantially but not exactly tangent to the adjoining circular sections and so shaped as to produce a sliding movement of the vanes within the rotor at such a rate that each working chamber of the pump will contain the same volume of liquid when it reaches the discharge position and that the vanes slide through the rotor at a uniform and constant velocity when the rotor is rotated at uniform angular velocity. In order to obtain this action and to accomplish the desired result, it is necessary that the non-circular or generated portions of the pump bore be complementary portions of an Archimedean spiral disposed as illustrated.

It is of course to be understood that the pump vanes may be used with or without packing strips or rockers at the ends thereof, depending upon the particular work for which the pump is designed. Various changes may be made in the details of construction such as in the manner of mounting the rotor without departing from the spirit of this invention, as the crux of the invention resides in the particular pump bore of such shape and curvature that the pump vanes recede into the rotor at uniform velocity upon rotation of the rotor at constant speed, the result being a pump which will have uniform displacement without pulsations. The invention is limited only in accordance with the scope of the appended claims.

Other modes of applying the principle of the invention may be employed, change being made as regards the details described, provided the features stated in any of the following claims or the equivalent of such be employed.

I, therefore, particularly point out and distinctly claim as my invention:

1. A pump comprising a pump body having a cavity formed therein and provided with an inlet port and an outlet port, a rotor rotatably mounted in said cavity eccentrically thereof, not more than two blades extending diametrically through the rotor and having a working fit with the walls of said cavity and dividing the same into a plurality of working chambers, said cavity having a cross section made up of two concentric circular arcs of different radii each less than a semi-circle and two adjoining curved sections which are complementary portions of an Archimedean spiral of common foci, the ends of said curved sections being each approximately but not exactly tangent to said circular arcs at the points of their intersection whereby each of said blades as it travels over the non-circular portion of the cavity will slide through said rotor a uniform distance for each degree of rotation of said rotor, said rotor fitting the circular arc of lesser radius.

2. A pump comprising a pump body having a cavity formed therein and provided with an inlet port and an outlet port, a rotor rotatably mounted in said cavity eccentrically thereof, not more than two blades extending diametrically through the rotor and having a working fit with the walls of said cavity and dividing said cavity into a plurality of working chambers, said cavity having a cross section made up of two concentric circular arcs of different radii, each less than a semi-circle and two adjoining curved sections which are complementary portions of an Archimedean spiral of common foci, the ends of said curved sections being each approximately but not exactly tangent to said circular arcs at the points of their intersection, whereby each of said blades as it travels over the non-circular portion of the cavity will slide through said rotor at a constant velocity when the rotor is rotated at uniform angular velocity, said rotor fitting the circular arc of lesser radius.

3. A pump comprising a pump body having a cavity formed therein and provided with an inlet and an outlet port, a rotor rotatably mounted in said cavity and eccentric thereto, not more than two blades extending diametrically through the rotor and having a working fit with the walls of said cavity and dividing said cavity into a plurality of working chambers, said cavity having a cross section made up of two concentric circular arcs of different radii, each less than a semi-circle and two adjoining curved sections which are complementary portions of an Archimedean spiral of common foci, the ends of said curved sections being each approximately but not exactly tangent to said circular arcs at the points of their intersection whereby each of said blades as it travels over the non-circular portion of the cavity will slide through said rotor at a constant velocity when the rotor is rotated at uniform angular velocity, the opposite ends of each of said blades being recessed and a rocker received in each of said recesses, the vanes and rockers together having a length equal to the sum of the radii of the two circular arcs, said rotor fitting the circular arc of lesser radius.

4. A pump comprising a pump body having a cavity formed therein and provided with an inlet port and an outlet port, a rotor rotatably mounted in said cavity, eccentrically thereof, three or more blades extending diametrically through the rotor and having a working fit with the walls of said cavity and dividing said cavity into a plurality of working chambers, said cavity having a cross section made up of two concentric circular arcs of different radii each less than a semi-circle and two adjoining curved sections which are complementary portions of an Archimedean spiral of common foci, the ends of said curved sections being each approximately but not exactly tangent to said circular arcs at the points of their intersection whereby each of said blades as it travels over the non-circular portion of the cavity will slide through said rotor a uniform distance for each degree of rotation of said rotor, said rotor fitting the circular arc of lesser radius.

5. A pump comprising a pump body having a cavity formed therein and provided with an inlet port and an outlet port, a rotor rotatably mounted in said cavity, eccentrically thereof, three or more blades extending diametrically through the rotor and having a working fit with the walls of said cavity and dividing said cavity into a plurality of working chambers, said cavity having a cross section made up of two concentric circular arcs of different radii each less than a semi-circle and two adjoining curved sections which are complementary portions of an Archimedean spiral of common foci, the ends of said curved sections being each approximately but not exactly tangent to said circular arcs at the points of their intersection whereby each of said blades as it travels over the non-circular portion of the cavity will slide through said rotor a uniform distance for each degree of rotation of said rotor.

6. A pump comprising a pump body having a cavity formed therein and provided with an inlet port and an outlet port, a rotor rotatably mounted in said cavity, eccentrically thereof, a plurality of blades extending diametrically through the rotor and having a working fit with the walls of said cavity and dividing said cavity into a plurality of working chambers, said cavity having a cross section made up of two concentric circular arcs of different radii each less than a semi-circle and two adjoining curved sections which are complementary portions of an Archimedean spiral of common foci, the ends of said curved sections being each approximately but not exactly tangent to said circular arcs at the points of their intersection whereby each of said blades as it travels over the non-circular portion of the cavity will slide through said rotor a uniform distance for each degree of rotation of said rotor.

7. A pump comprising a pump body having a cavity formed therein and provided with an inlet port and an outlet port, a rotor rotatably mounted in said cavity, eccentrically thereof, a plurality of blades extending diametrically through the rotor and having a working fit with the walls of said cavity and dividing said cavity into a plurality of working chambers, said cavity having a cross section made up of two concentric circular arcs of different radii each less than a semi-circle and two adjoining curved sections which are complementary portions of an Archimedean spiral of common foci, the ends of said curved sections being each approximately but not exactly tangent to said circular arcs at the points of their intersection whereby each of said blades as it travels over the non-circular portion of the cavity will slide through said rotor a uniform distance for each degree of rotation of said rotor, said rotor fitting the circular arc of lesser radius.

WALWIN L. DAVIS.